United States Patent
Russell et al.

(10) Patent No.: US 7,165,114 B1
(45) Date of Patent: Jan. 16, 2007

(54) WEB STREAMING IN A MESSAGING SYSTEM

(76) Inventors: Gary P. Russell, 670 Coates La., King of Prussia, PA (US) 19406; Judith A. Cadmus, 3864 Township Line Rd., Collegeville, PA (US) 19426; Alex C. Freiman, 162 Cedar Dr., New Britain, PA (US) 18901; James W. Mann, 636 Neiman Rd., Pottstown, PA (US) 19465

( * ) Notice: Subject to any disclaimer, the term of this patent is extended or adjusted under 35 U.S.C. 154(b) by 949 days.

(21) Appl. No.: 10/038,962

(22) Filed: Jan. 3, 2002

(51) Int. Cl.
*G06F 15/16* (2006.01)
*H44M 11/00* (2006.01)

(52) U.S. Cl. ............... 709/231; 709/203; 709/206
(58) Field of Classification Search ........ 709/201–203, 709/217–219, 230–232, 205–207; 379/88.13; 455/412.1
See application file for complete search history.

(56) References Cited

U.S. PATENT DOCUMENTS

| | | | |
|---|---|---|---|
| 5,737,395 A | 4/1998 | Irribarren | 379/88 |
| 5,951,638 A | 9/1999 | Hoss et al. | 709/206 |
| 6,025,931 A | 2/2000 | Bloomfield | 358/402 |
| 6,058,435 A | 5/2000 | Sassin et al. | 709/305 |
| 6,092,102 A * | 7/2000 | Wagner | 340/7.29 |
| 6,134,235 A | 10/2000 | Goldman et al. | 370/352 |
| 6,230,181 B1 * | 5/2001 | Mitchell et al. | 718/100 |
| 6,233,318 B1 * | 5/2001 | Picard et al. | 379/88.17 |
| 6,301,245 B1 | 10/2001 | Luzeski et al. | 370/352 |
| 2002/0165904 A1 * | 11/2002 | Meyer et al. | 709/203 |

FOREIGN PATENT DOCUMENTS

| | | |
|---|---|---|
| EP | 0 845 895 A2 | 6/1998 |
| GB | 2 301 260 A | 11/1996 |
| WO | WO 96/34341 | 10/1996 |

* cited by examiner

*Primary Examiner*—Glenton B. Burgess
*Assistant Examiner*—Yasin M. Barqadle
(74) *Attorney, Agent, or Firm*—Richard J. Gregson; Mark T. Starr; Woodcock Washburn

(57) ABSTRACT

A messaging system having a network interface unit (NIU) with an embedded services processor (ESP) that provides a general purpose computing capability within the NIU that supports the streaming of data for the messaging system with external computer networks, and that may also have the ability to connect to networks external to the messaging system via that general purpose computing capability is disclosed.

31 Claims, 10 Drawing Sheets

WEB STREAMING IN A MESSAGING SYSTEM

FIELD OF THE INVENTION

The present invention relates generally to messaging systems having network interface units (NIUs) that interface the messaging systems to a communications network and that are capable of performing media processing and, more particularly, to a network interface unit (NIU) having an embedded processor capable of executing Web streaming applications not otherwise capable of execution on the NIU and capable of communicating to other devices on a network external to the voice messaging system.

BACKGROUND OF THE INVENTION

Messaging systems that provide voice and fax messaging capabilities are well known. One example of such a messaging system is the Network Applications Platform commercially available from UNISYS Corporation ("the NAP system"). The NAP system is a configuration of hardware and software that provides data and voice processing capabilities through applications running on an enterprise server. The NAP system provides the interface between these applications, called network applications, and a telephone network. A voicemail application is an example of a network application that runs on the NAP platform. The voicemail application determines how calls to the messaging system are handled, what prompts are played to callers, and which features are available. Presently, the NAP is implemented on selected UNISYS A Series and ClearPath HMP NX computer systems running the MCP operating system.

Generally, the NAP platform interfaces to a telephone network through a Network Interface Unit (NIU). Current NAP systems utilize a NIU available from Unisys Corporation, called the Telephony Services Platform (TSP). Generally, the TSP comprises a MultiBus bus architecture (e.g. IEEE 1296 MultiBus) that connects a variety of special purpose printed circuit boards that provide interfaces to the host computer system on which the NAP is implemented and to the telephone network to which the TSP is connected.

In greater detail, FIG. 1 shows a system diagram of a prior art messaging system 100 based on the Unisys NAP architecture. As shown, the system 100 comprises host computer 110 that implements the NAP messaging platform 115, a network interface unit (NIU) 140, which in this example is the Unisys TSP, public switched telephone network 155, and telephone based subscribers 165. Network applications 120 and 125, which may be voice mail applications or any other application that provides telephony related services, run on the NAP platform 115 and cooperate with message store 130.

As shown, the NIU 140, which in this example comprises a Unisys TSP, contains a series of interfaces, interface 1 (INT1), interface 2 (INT2), and interface 3 (INT3). One interface, such as INT1, interfaces the NIU 140 to the NAP platform 115 on the host computer 110. Communication between INT1 and NAP platform 115 is via a Small Computer Systems Interface (SCSI) bus 135. Others of the interfaces, such as INT2 and INT3, interface NIU 140 to PSTN 155. In the current TSP design, interfaces such as INT1, INT2, and INT3 are implemented on printed circuit boards housed within the NIU that can communicate with each other via a common bus 145. Bus 145 implements the MultiBus (IEEE 1296) open bus standard protocol.

In operation, telephone based subscribers 165 may request processing performed by network application 120 or 125, or alternatively, access data from message store 130. The request is transmitted from telephone-based subscriber 165 through PSTN 155 to NIU 140. At NIU 140, the proper interface (i.e. INT1, INT2, or INT3) may route the request to messaging platform 115 of host computer 110 running network applications 120 and 125. Similarly, requested processed data may be communicated back to telephone-based subscribers using this data path.

FIG. 1A is a block diagram providing additional details of the Unisys TSP that implements the NIU 140 in FIG. 1. As shown, interfaces INT2, INT3 are each implemented in the TSP 140 by a Primary Rate Interface Module (PRIM) 140-1, of which there can be many in any given TSP. Interface INT1 is implemented by a PDP4 Card. Each PRIM 140-1 interfaces a set of (e.g., 24 or 32) telephone circuits to the PDP4 card. In addition, one PRIM 140-1a is dedicated to signaling, and communicates with the PDP4 Card's Signaling Manager 140-2a, which in turn communicates with a Host Management Services (HMS) module 140-2b. The HMS module 140-2b communicates with a Cache Manager 140-2c and a Host Interface module 140-2d. The overall function of the TSP 140 is to logically map a plurality of telephone circuits (e.g., 24 or 32 telephone circuits per PRIM) to a NAP host (e.g., host 110 of FIG. 1).

Briefly, an SS7 packet received at a PRIM is routed to the Signaling Manager 140-2a, which is the SS7 User Part (SS7 level 4). The Signaling Manager converts the SS7 packet to a proprietary message that is ultimately received by the host 110. Before sending the message to the host, the HMS module 140-2b selects the host (there can be more than one host connected to a given TSP).

Thus, the components of a TSP 140 may be summarized as follows:

PRIM (Primary Rate Interface module) 140-1: The TSP PRIM module is used to send voice or receive voice from the network upon direction from the NAP 115

Signaling Manager 140-2a: The Signaling Manager is used to communicate to the network using a country specific protocol such as SS7 or ISDN. It also communicates to the NAP 115 for circuit maintenance and for call control.

HMS (Host Management Services module) 140-2b: The TSP HMS module is used to centralize the TSP's handling of the shared TSP functionality described in the aforementioned co-pending patent application Ser. No. 09/307,014, entitled "Inter-System Call Transfer". It insulates the rest of the TSP from the mechanics of switching calls from one host to another. It communicates to the NAP 115 to transfer calls and to configure the shared TSP environment. All TSP message traffic is routed through the HMS module.

CM (Cache Manager) 140-2c: The TSP CM module is used to provide a high speed buffering of commonly used voice messages to reduce demand on the NAP 115.

HIP (Host Interface Processor) 140-2d: The HIP board is used to communicate to the operating system of the host computer 110 using a SCSI bus to transfer and receive buffers of data between the NAP 115 and TSP. It enforces a protocol on the TSP to collect messages in an efficient manner to transmit to the host 110 and similarly breaks apart buffers from the host into messages that can be processed by other TSP modules.

Thus, as shown, the TSP 140 is connected to certain "ports" of the telephone network 155. A call coming into a given port is received by the TSP connected to that port. Specifically, a call comes into a PRIM board in the TSP, and the Signaling Manager on the PDP card of that TSP routes the call to the Host Management Services (HMS) module 140-2b. The call comes in on a reserved signaling channel 140-1a of the PRIM and is immediately transferred to the Signaling Manager 140-2a on the PDP board. The signaling manager reformats the call packet and gives it to the HMS module 140-2b, which in turn gives it to the Host Interface Module 140-2d. The Host Interface Module 140-2d places the call on the SCSI bus 135. The NAP 115 takes the call from the SCSI bus, creates a call record, interrogates a database information in memory to obtain the necessary information to route the call to the proper network application 120, 125, and then queues the call to an application interface module (AIM) (not shown). The AIM dequeues the call and gives it to the specified network application 120, 125.

Although current messaging platforms provide a number of media processing features, such features are generally processed on the host computer of the messaging platform wasting valuable processing resources and requiring considerable time to process media. Furthermore, although current messaging platforms allow for the ability to offload such media processing to more efficient computing platforms for processing, such systems and methods are in themselves inefficient often requiring specialized hardware and/or software configurations. The rigidity of current messaging platforms to offload processing renders media processing and arduous task at best. The burdens of media processing are most felt when trying to perform streaming of Web data (e.g. communicating e-mail messages to a voice mail box of a messaging platform) from external networks. Web data, by its nature, can be large and cumbersome requiring extensive processing. As such, current messaging platforms (even ones that offload processing) are not equipped to best process Web type data.

From the foregoing it is appreciated that there exists a need for systems and methods that provide efficient processing of media data.

SUMMARY OF THE INVENTION

The present invention relates to a messaging system providing the streaming of data in a messaging system environment. In a contemplated messaging system architecture, the messaging platform may comprise a host computer running messaging applications. The host computer may be electronically coupled to a NIU that may be connected to a telephone network. The network interface unit (NIU) may comprise interfaces to the messaging platform, external computing networks, and to the host computer that facilitate the communication of data between the host computer, the messaging platform, and the external computer networks. The NIU may further comprise at least one ESP that may be operatively coupled to the NIU interfaces. The ESP may comprise a processor, a memory, and an operating system executing on the processor that provide a general purpose computing capability within NIU for executing web-streaming software applications.

In an illustrative implementation, the ESP may be capable of running commercially available hardware and commodity software, and may have the ability to communicate with the computer networks external to the messaging system using Internet-based communication protocols and standards to realize media processing features. In this implementation, at least one data streaming computing application operates on the ESP to convert data from external web networks for use on the host computer of the messaging platform and vice versa.

Other aspects of the invention are described below.

BRIEF DESCRIPTION OF THE DRAWING

A presently preferred implementation of a messaging system offering data streaming is further described with reference to the accompanying drawings in which.

DETAILED DESCRIPTION OF PREFERRED EMBODIMENTS

Figure 1:
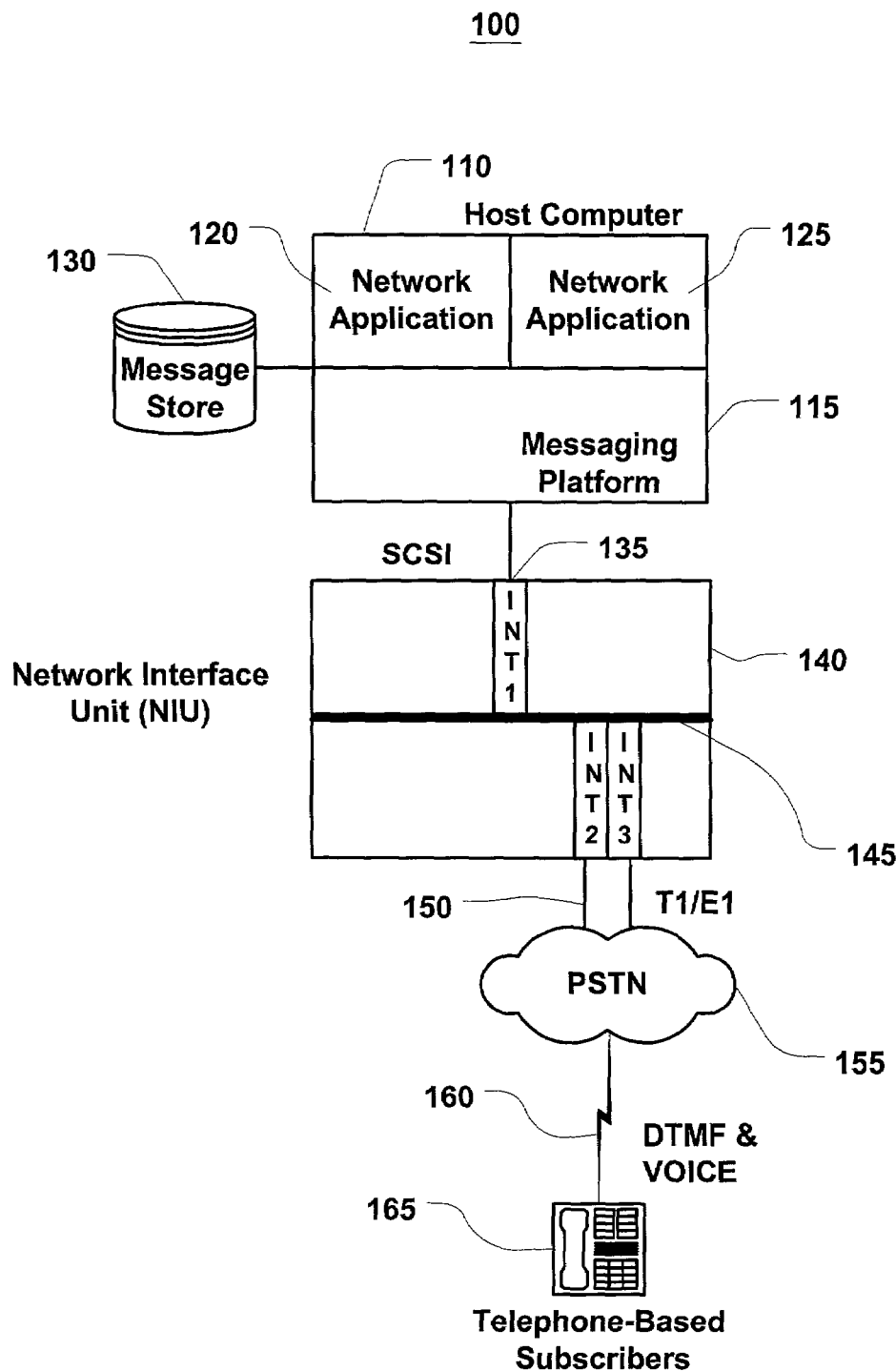
FIG. 1 is a system diagram of a prior art messaging system.

Overview:

The Internet has proven to be an effective communication medium that has penetrated even the simplest of daily activities. As usage has increased, new products and services have been and are being developed to exploit this medium. These services may offer new features, or, alternatively, may offer the cyber-equivalent of real-world features. For example, voice mail and facsimiles are traditionally communicated using publicly switched telephone networks. A typical scenario contemplates a first party placing a telephone or data call to a second party using a telephone network. In the event that the second party is not available to take the call from the first party, the phone network of the second party, employing a universal messaging application, may accept and store a voice mail or fax from the first party. The universal messaging application associates a unique identifier to the voice mail or fax to allow future retrieval of the stored voice mails and/or facsimiles. Current systems and methods (e.g. current universal messaging systems and applications) contemplate the retrieval of stored voice mails and/or facsimiles using a standard telephone connection (e.g. a telephone handset or facsimile apparatus connected to the phone network) and generally do not contemplate the streaming of voice or other data over the Internet. Hence, current practices fall short to satisfy Internet consumers' needs. Stated differently, as consumers begin to migrate more of their routines to the Internet, a single point of access for the various communications performed (e.g. e-mail, voice-mail, facsimile, instant messaging, and other data transfers) is sought. Consumers would prefer to access these varied communications from a single access point (e.g. a desktop computer, a notebook computer, a hiptop computer, or other stationary or mobile computing device). To satisfy consumer demands, it would be advantageous to provide voice mail or fax communication over the Internet that may be played back or displayed on a single Internet enabled computing application. The delivery of audio or video content to computing applications is generally known as streaming. Today, there are various streaming technologies that allow for the streaming of audio and video content to Internet enabled computing applications. However these streaming technologies do not contemplate the streaming of voice content or faxes between a messaging platform and Internet enabled computing applications.

Generally, the present invention relates to the communication of data (e.g. voice or fax content) between an exemplary messaging platform (e.g. exemplary messaging system of FIG. 2) and cooperating Internet browsing computing applications using Internet communication standards and protocols. In an illustrative implementation, the present invention may be realized as a computing application running on an Embedded Services Processor (ESP) located in a Network Interface Unit (NIU) of an exemplary messaging system. In this implementation, the computing application is in communication with the host of the messaging system utilizing an Inter-host Communication Protocol (IHCP) and with the Internet through an Internet interface of the Embedded Services Processor (ESP). The computing application performs various functions including, the "Streaming of voice/fax Out" ("Streaming Out"), the "Streaming of Voice/Fax In" ("Streaming In"), and "Internet Protocol Socket API Proxy."

For example, when processing the "Streaming In" function, the embedded services processor may receive an incoming message to put data into a voice file located in the host computer of the messaging system. In addition, the message may contain the actual voice/fax data and information about the format of the data. In turn, the embedded services processor may generate a series of instructions for communication to the host computer of the messaging system to indicate storage of this data. The host may receive the aforementioned data for storage into a data file and associate a unique message identifier for this file. This unique message identifier may then be sent to the NIU and stored. The unique message number may be used when retrieving a desired message.

The processing for "Streaming Out" is related to the "Streaming In" function described above. A request may be made to the computing application of the embedded services processor (ESP) for voice/fax content. Included in the request is the unique message identifier for the desired content. The request is passed along to the host computer of the messaging system to retrieve the indicated message. This request may comprise various steps including: 1) the building of an IHCP message (Get Data From Voice File Response); and 2) the writing of the response of the IHCP message to a socket.

Another aspect of the invention as described in the exemplary implementation contemplates the use of an Internet Protocol Socket API Proxy. The Internet Protocol Socket API Proxy is a TCP/UDP interface that allows any software running on the messaging system to use the efficient data interface of the ESP to connect to an IP Network. In an illustrative implementation, the proxy interface may be part of an Application Program Interface (API) that runs on the ESP of the NIU. The host computer contains a connection library interface that allows the exporting of some subset of the Internet Protocol (IP) Socket API routines that perform various functions (i.e. listen, accept, connect, send, receive, etc.). Accordingly, when a client on the messaging platform host computer calls one of these routines, the host computer may build a new NIU instruction (i.e. operation) containing the parameter data and send it to the ESP of the NIU. Software on the ESP would then take this data and call the corresponding Internet Protocol (IP) Socket API (e.g. Winsock Proxy) routine to perform the desired function. The results from such calls would be returned to the host in a similar manner. With the present invention, the streaming of data from external networks (e.g. Web-based data) to a messaging system is realized.

Figure 2:
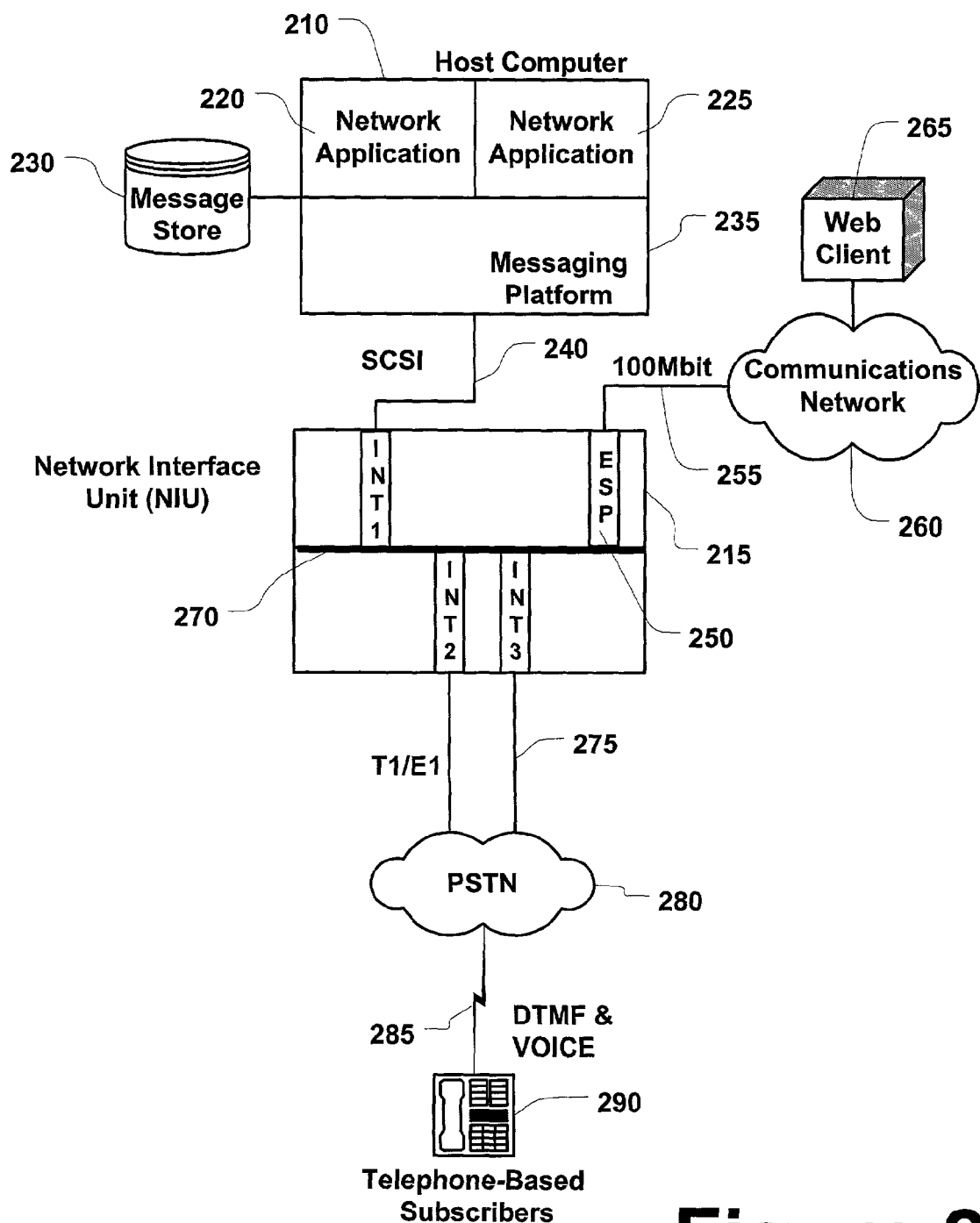
FIG. 2 is a block diagram of an exemplary messaging system having components that allow for the streaming of web data in accordance with the present invention.

Exemplary Messaging System:

FIG. 2 is a block diagram of a messaging system 200 in accordance with a preferred embodiment of the present invention. Messaging system 200 comprises host computer 210 electronically coupled to network interface unit (NIU) 215. In turn, NIU 215 is electronically coupled to public switched telephone network (PSTN) 280 that supports telephone-based subscribers 290. As shown, host computer 210 comprises a messaging platform 235 that executes network applications 220 and 225, respectively. In addition, the messaging platform may allow network applications 220 and 225 to cooperate with message store 230. Message store 230 may be used by messaging system 200 to store data for telephone-based subscribers 290. In the preferred embodiment, messaging platform 235 comprises the aforementioned Network Applications Platform (NAP) commercially available from Unisys Corporation, and the host computer 210 on which the NAP runs comprises a selected Unisys A Series or ClearPath HMP NX computer system, also commercially available from Unisys Corporation. Host computer 210 communicates with NIU 215 via electronic connection 240. However, it should be noted that the present invention is by no means limited to use in the illustrative systems as they are merely exemplary. Rather, the inventive concepts described herein may be used in any computing environment operating and/or executing any of a number of various messaging system applications.

Figure 1A:
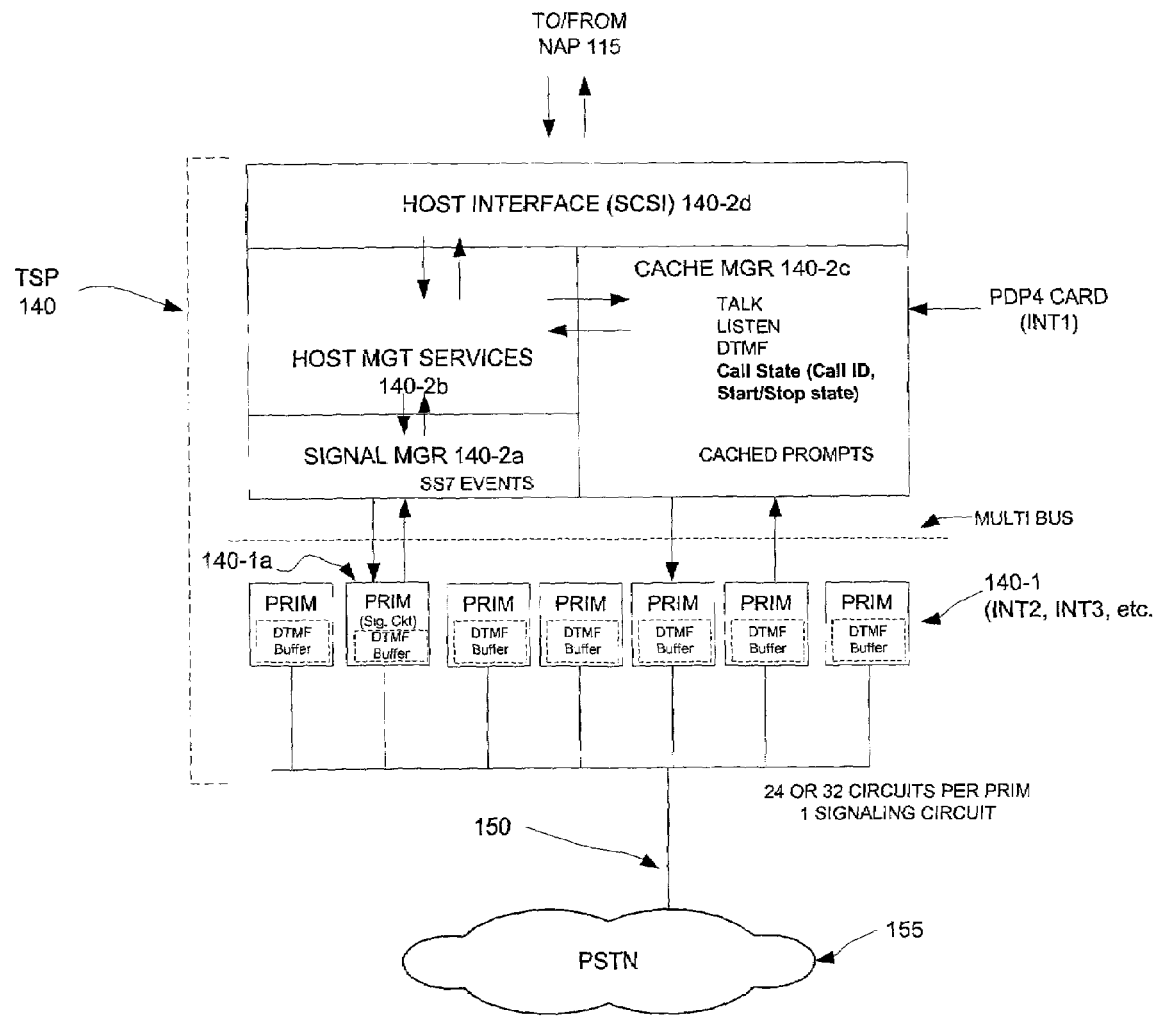
FIG. 1A is a block diagram providing further details of a prior art Network Interface Unit of the messaging system of FIG. 1.

In the preferred embodiment, the NIU 215 comprises a modified Telephony Services Processor (TSP) of the type described above and illustrated in FIGS. 1 and 1a. According to the present invention, that TSP is modified by the addition of an embedded services processor (ESP) 250. In the preferred embodiment, the ESP 250 comprises a single board computer having its own processor, memory, and operating system executing on the processor, which together provide a general purpose computing capability within the NIU for executing software applications that are otherwise incapable of executing within the NIU. Additionally, the ESP 250 preferably also provides a network interface for connection of the NIU to other communications networks external to the messaging system, such as communications network 260 (e.g. communications network 260 may comprise any of a fixed-wire LAN, a wireless LAN, a fixed wire WAN, a wireless WAN, an fixed wire intranet, a wireless intranet, a fixed wire extranet, a wireless extranet, the Internet, and the wireless Internet.) This network connection 260 can be used to communicate with an external server computer (ESC e.g. Web Server) 265 or external maintenance server (EMS) (not shown). ESC 265 may comprise server computer capable of operating various computing applications, such as, media processing applications that cooperate with messaging system 200. Comparatively, EMS 267 comprises a personal computer (PC) executing a maintenance software application that may be used to install ESP software, update ESP software, and monitor ESP status.

In one preferred implementation, the ESP 250 comprises an EWSIII SBCP5200 single board computer commercially available from RadiSys Corporation. This board includes an Intel Pentium processor and executes the Microsoft Windows NT 4.0 operating system. A pair of 10/100 BaseT Ethernet controllers provide the network interface for connecting to and communicating across communications network 260. This enables the ESP 250 to support connection to 100 Megabit Ethernet communications networks. The ESP 250 connects to the MultiBus bus 270 within the standard TSP chassis, enabling it to communicate with the other interface boards INT1, INT2, INT3, etc. (e.g. PRIM and PDP boards) within the TSP 215.

Communication between the ESP and interface boards INT1, INT2, and INT3 of TSP 215 can occur in one of two ways, using messaging passing or using interconnect spacing. Generally, a message is a unit of data that is passed over MultiBus 270. Further, any application employing MultiBus 270 can send a message to any other application running on the same interface board or to any other interface board connected to MultiBus 270, independent of the operating system. A message contains a sender address and a destination address. The addresses, when taken in combination, define a slot (i.e. an interface board in the system) and a port (a function of this interface board). If messaging passing is employed, the source and the destination of the message must be identified. This is accomplished by assigning a slot number and a Port ID to the source and destination of the message, respectively. The slot number identifies the interface board's backplane slot and the port ID identifies the desired function to be carried out by the interface board having the slot number. Comparatively, interconnect space messaging employs an address space, that is separate from conventional memory and I/O spaces. In the interconnect space, interface boards coupled to MultiBus 270 can exchange data. The data is passed employing the MultiBus (IEEE 1296) 270 open bus standard.

Having a general purpose computing capability within NIU (TSP) 215, and more generally, at the point in the architecture of messaging system 200 where the messaging platform 235 interfaces to the telephone network 280, enables a variety of new and improved features and operations for the messaging system 200.

In one preferred implementation, the ESP 250 comprises an EWSIII SBCP5200 single board computer commercially available from RadiSys Corporation. This board includes an Intel Pentium processor and executes the Microsoft Windows NT 4.0 operating system. A pair of 10/100 BaseT Ethernet controllers provide the network interface for connecting to and communicating across communications network 260. This enables the ESP 250 to support connection to 100 Megabit Ethernet communications networks. The ESP 250 connects to the MultiBus bus 270 within the standard TSP chassis, enabling it to communicate with the other interface boards INT1, INT2, INT3, etc. (e.g., PRIM and PDP boards) within the TSP 215.

Communication between the ESP and interface boards INT1, INT2, and INT3 of TSP 215 can occur one of two ways, using messaging passing or using interconnect spacing. Generally, a message is a unit of data that is passed over Mutlibus 270. Further, any application employing Multibus 270 can send a message to any other application running on the same interface board or to any other interface board connected to Multibus 270, independent of opreating system. A message contains a sender address and a destination address. The addresses, when taken in combination, define a slot (i.e. an interface board in the system) and a port (a function of this interface board). If messaging passing is employed, the source and the destination of the message must be identified. This is accomplished by assigning a slot number and a Port ID to the source and destination of the message, respectively. The slot number identifies the interface board's backplane slot and port ID identifies the desired function to be carried out by the interface board having the slot number. Comparatively, interconnect space messaging employs an address space, that is separate from conventional memory and I/O spaces. In the interconnect space, interface boards coupled to Multibus 270 can exchange data. The data is passed using Multibus 270 employs access methods and message structures of the Multibus (IEEE 1296) open bus standard.

Figure 3:
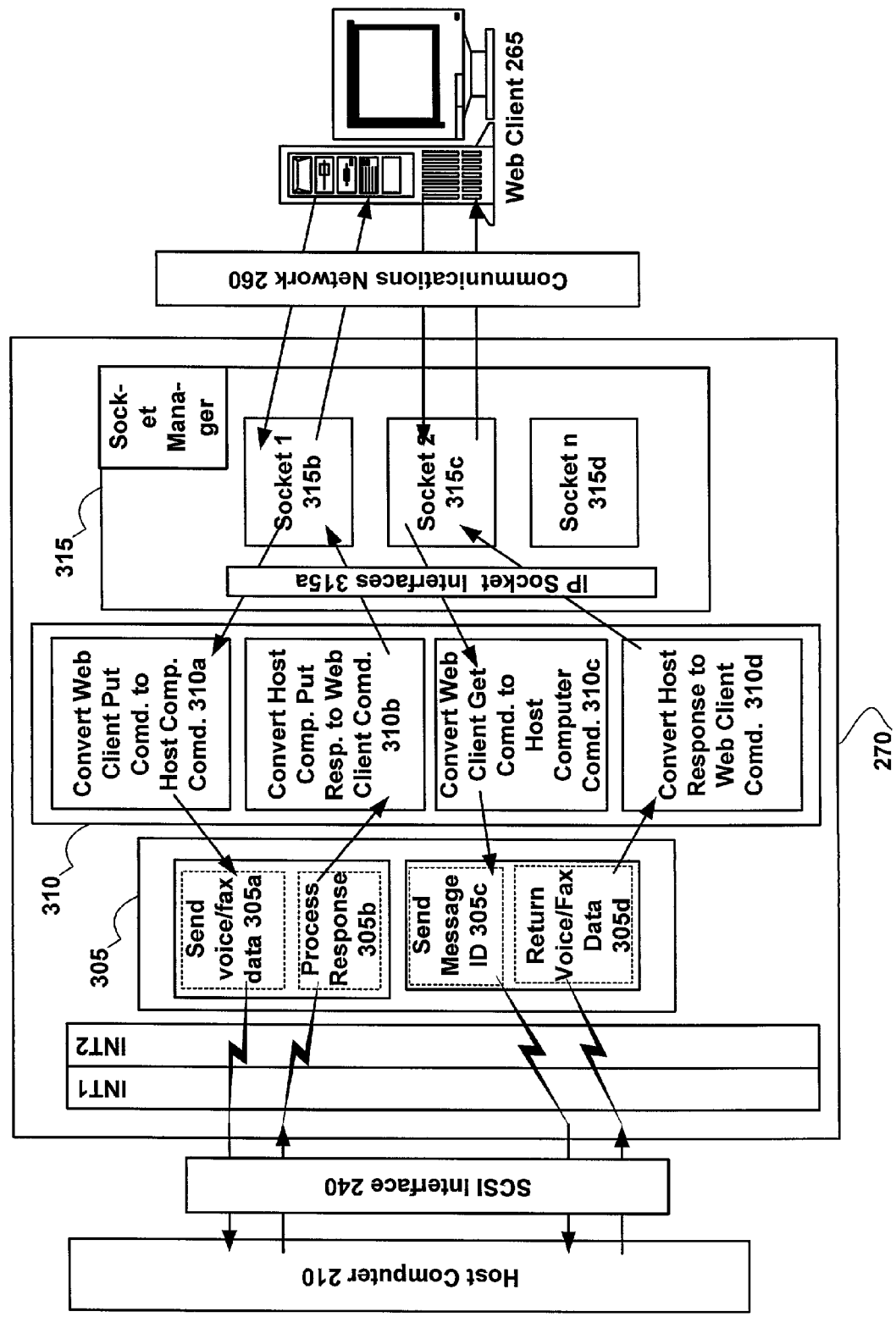
FIG. 3 is a block diagram showing the interaction of software components of an exemplary architecture of the messaging system when performing data streaming in accordance with the present invention.

FIG. 3, with reference to FIG. 2, shows a contemplated software architecture of messaging system 200. This software architecture may be used when deploying ESP 250 in messaging system 200 to realize data streaming of data, particularly in application in which the ESP 250 will be used to communicate with a Web client 265, such as a browser-type computing application (e.g. MICROSOFT® INTERNET EXPLOER® NETSCAPE®COMMUNICATOR®, or any other Web-enabled computing application). As shown, the exemplary software architecture comprises Host Computer to NIU processing area 305, Instructions Processing Area 310, and NIU to External Network Processing Area 315. Host Computer to NIU Processing Area 305 further comprises Host Computer to NIU processing blocks "Send Voice/Fax Data" 305*a*, "Process Response" 305*b*, "Send Message ID" 305*c*, and "Return Voice/Fax Data" 305*d*. Instructions Processing Area 310 further comprises processing blocks "Convert Web Client Put Command to Host Computer Command" 310*a*, "Convert Host Computer Put Response to Web Client Command" 310*b*, "Convert Web Client Get Command to Host Computer Command" 310*c*, and "Convert Host Response To Web Client Command" 310*d*. NIU to External Networks Processing Area 315 further comprises processing blocks IP Socket Interfaces Area 315*a*, "Socket 1" 315*b*, "Socket 2" 315*c*, and "Socket n" 315*d*.

In operation, data may be communicated from Web Client 265 to Host Computer 210 (and vice versa) through NIU 215 to enable the streaming of data. Specifically, a request for data to be streamed originates at Web Client 265 and is communicated to NIU 215 through communications network 260. The request is received and prepared for processing by NIU 215 via NIU to External Networks Processing Area 315. Within Processing Area 315, the request is routed to one of the many communication sockets (e.g "Socket 1" 315*b*) for communication to Instructions Processing Area 310 via IP Socket interfaces processing block 315*a*. The request is then communicated to Instructions Processing Area 310 where it is converted to a data format consistent with host computer 210 syntax. Depending on the nature of the request, i.e. if the request is to transfer data from Web client 265 (e.g. a PUT command) to host computer 210, or, alternatively, to transfer data from host computer 210 to Web Client 265 (e.g. a GET command), the request is routed to different processing blocks within Instructions Processing Area 310. If the request offered by Web client 265 is to obtain data from host computer 210, the request is processed by block 310c of Instructions Processing Area 310, where the request is converted from a Web Client "GET" command to an appropriate (and/or equivalent) command consistent with host computer 210 syntax. Alternatively, if the request is to place data (e.g. voice/fax data) from Web client 265 to host computer 210, the request is processed by processing block 310a of Instructions Processing Area 310 where the Web Client "PUT" command is converted to appropriate command consistent with host computer 210 syntax. Generally the "GET" command is offered by the Web client to retrieve data from host computer 265 (e.g. to retrieve stored voice/fax data). Comparatively, the "PUT" command is offered (with associating data) to place and/or store desired data on host computer 210. As used herein, the term "processing area" refers to one or more instructions that operate on data. These instructions may comprise computer readable instructions to perform one or more functions on data. In an illustrative implementation, the various processing areas of the present invention comprises at least one algorithm that accepts a variety of data as input and performs one or more functions to produce output data.

When a "GET" command is offered by Web client 265, the command, converted by Instructions Processing Area 310, is communicated to Host Computer to NIU Processing Area 305. Specifically, the converted "GET" command is translated to a "Send Message ID" host computer 210 command by "Send Message ID" processing block 305c of Host Computer to NIU Processing Area 305. This command communicates to host computer 210 the data that is desired for streaming to Web client 265. Conversely, when a Web Client "PUT" command is processed, voice and/or fax data is transferred from Web Client 265 to host computer 210 through "Send Voice/Fax Data" processing block 305a of Host Computer to NIU Processing area 305. In the illustrative implementation, the voice/fax data may reside in various digital formats (i.e. formats that can be processed by host computer 210) that gets attached to a Web client "PUT" command when offered. In either scenario (i.e. when a "GET" and/or "PUT" command is offered), the command is communicated from Host Computer to NIU Processing Area 305 to host computer 210 through SCSI Interface 240.

Host computer 210 may respond to requests proffered by Web Client 265. In the event a "PUT" command is provided by Web Client 265, host computer 210 acknowledges receipt of the voice/fax data by providing an appropriate response. The response is communicated to Host Computer to NIU Processing Area 305 for processing by "Process Response" processing block 304b. From there the response is communicated to Instructions Processing Area 310 where the response is converted from a host computer operable response to a Web Client 265 command. The converted response to the "PUT" command is then communicated to NIU to External Computer Network Processing Area 315 where it is processed by IP Socket Interface Area 315a for communication to Web Client 265 through one of the plurality of sockets that are coupled to communications network 260. Clearing the communications network, the host response to the "PUT" command is received by Web Client 265 for processing. Comparatively, host computer 210 may offer a response to a Web Client 265 "GET" command. In this scenario, a response having attached the requested voice/fax data is communicated to Host Computer to NIU Processing Area 210 for processing by "Return Voice/Fax Data" processing block 305d. From there the response (and desired requested voice/fax data) is communicated to Instructions Processing Area 310 where the host computer response to the "GET" command is converted to a Web client 265 command by processing block 310d. The converted response (and desired requested voice/fax data) is then communicated to NIU to External Computer Network Processing Area 315 where it is processed by IP Socket Interface Area 315a for communication to Web client 265 through one of a plurality of sockets that are coupled to Web client 265 through communications network 260. Clearing processing area, the response (and desired requested voice/fax data) is received by Web client 265 for processing.

From participating users' perspective, the illustrative implementation contemplates a user interface operating on Web client 265 (e.g. a Web browsing computing application) that allows participating users to offer "GET" and "PUT" type commands to host computer 210 for the communication of desired voice/fax data.

FIG. 3 shows a block diagram of a preferred software architecture of messaging system 200. This software architecture may be used when deploying ESP 250 in messaging system 200 to realize data streaming of data, particularly in application in which the ESP 250 will be used to communicate with a Web client 265, such as a browser-type computing application (e.g. MICROSOFT® INTERNET EXPLOER®, NETSCAPE® COMMUNICATOR®, or any other Web-enabled computing application). As shown, the preferred software architecture comprises MultiBus Receive Thread 340, Threads, 335, 345, 350, and 355, and DSS Thread Manager 325. Further, each thread comprises DSD 335a, DSS IP Socket Interface 335b, and socket 330.

The preferred architecture contemplates the streaming of data from host computer 210 to Web client through communication between software operating on ESP board 250 of TSP 215. The streaming of data via TSP 215 encompasses receiving data (e.g. voice and/or fax data) from one or more Web client 265 and depositing the data to a host computer 210 file and vice versa. Data streaming is initiated when the Web client (e.g. Web client 265) sends one of the following IHCP commands to a Data Streaming Service (DSS) operating on an ESP 250 board operating in TSP 215. The PutDataInFile command takes data from one more Web clients and deposits into a host computer 210 data file. A Response containing a unique ID is returned to the Web client. Comparatively, the GetDataFromFile retrieves data from the host computer 210 and returns it to the Web client 265. In operation, the Web client 265 sends one of the these commands over a TCP/IP communications network (or other communications network offering similar operations—e.g. ATM network) to the DSS port (not shown) on 215 ESP 250 board. DSS software operating on the ESP board 250 then retrieves the command and sends it to a cooperating DSD (Data Service DDL—DLL being a Dynamic Link Library) for processing. The DSS software then sends a Response back to the Web Client.

In a first instance where a first request (e.g. Web client 265 establishes a "connect" with TSP 215) is made to stream data from the host computer 210 to Web client 265, a new command request originates from Web client 265 and is communicated to DSS thread manager 325 through TCP/IP communications network 260(*a*) and ESP Port 320. In turn, DSS (Data Streaming Service) Manager 325 "wakes up" an unused thread from the thread pool to process the command. In operation, a single thread is used to process an entire command from reading it to passing back a response to the Web client 265. Generally, every command is assigned it's own thread, thereby allowing multiple commands to be processed at the same time. In subsequent requests between Web client 265 and host computer 210, an established thread may be utilized to communicate such requests. In this context, the requests are communicated to the threads through socket 330. Socket 330, in turn, cooperates with DSS IP Socket Interface 335b to communicate such requests.

Once the thread is assigned (or awoken), the thread loads a Data Streaming DLL (DSD) 335a. In operation, the DLL converts the IHCP command (e.g. Web client type command) into a DMMM (Data Messaging Management Module—a module operating on host computer 210 to process data requests)/MultiBus command. Further, the DSD 335a communicates the command through the MultiBus (element 270 of FIG. 2) to the DMMM and waits for a response. Once the response is received, the DSD 335a communicates the response back to Web client 265. The DSS Thread Manager 325 then puts the thread processing the request to "sleep".

Since the illustrative embodiment capitalizes on the ability of TCP/IP to "stream" data whole and/or in parts, the DSS Thread Manager 325 may not retrieve an entire IHCP command on one "receive" call. A "Receive" might return only a portion of the entire command. In this event, the DSS Thread Manager 325 may need to perform multiple "Receives" until the entire command has been read in.

A DSS "Receive" is event driven by the DSD 335a. When the DSD 335a is ready to process more command data, it sets an event, and returns control to the DSS. The DSS, in turn, sends the data to the DSD. The DSS then does another "Receive" on the socket to get more command data. In an optimal configuration, the DSS "Receives" are double buffered to minimize performance issues. Generally, when the DSD receives data from the DSS, it buffers the data until a pre-set number of bytes (e.g. 32 kilobytes) have been received from the DSS. It then creates a DMMM command, encapsulates it in a MultiBus message descriptor, and issues a MultiBus "Send" to the DMMM (not shown). After the DMMM (not shown) receives the entire command, it returns one or more response records to the MutliBus "Receive" Thread (MRT) 340. The MRT 340 then sends the records to the DSD that sends each response record back to the DSS to steam back to the Web client 265.

The DSD 335a returns response data when the DSS 325 signals an event indicating that it is ready to process the response. In the case of a GetDataFromFile command, the response can be rather large. As such, a maximum byte length (e.g. 32 kilobytes) may be imposed to reduce processing burdens and to reduce latency between a request and a response. One or more response records are then returned from the DSD 335a to the DSS 325. Each individual response record is then streamed back tot eh Web Client 265 by the DSS 325.

Figure 4:
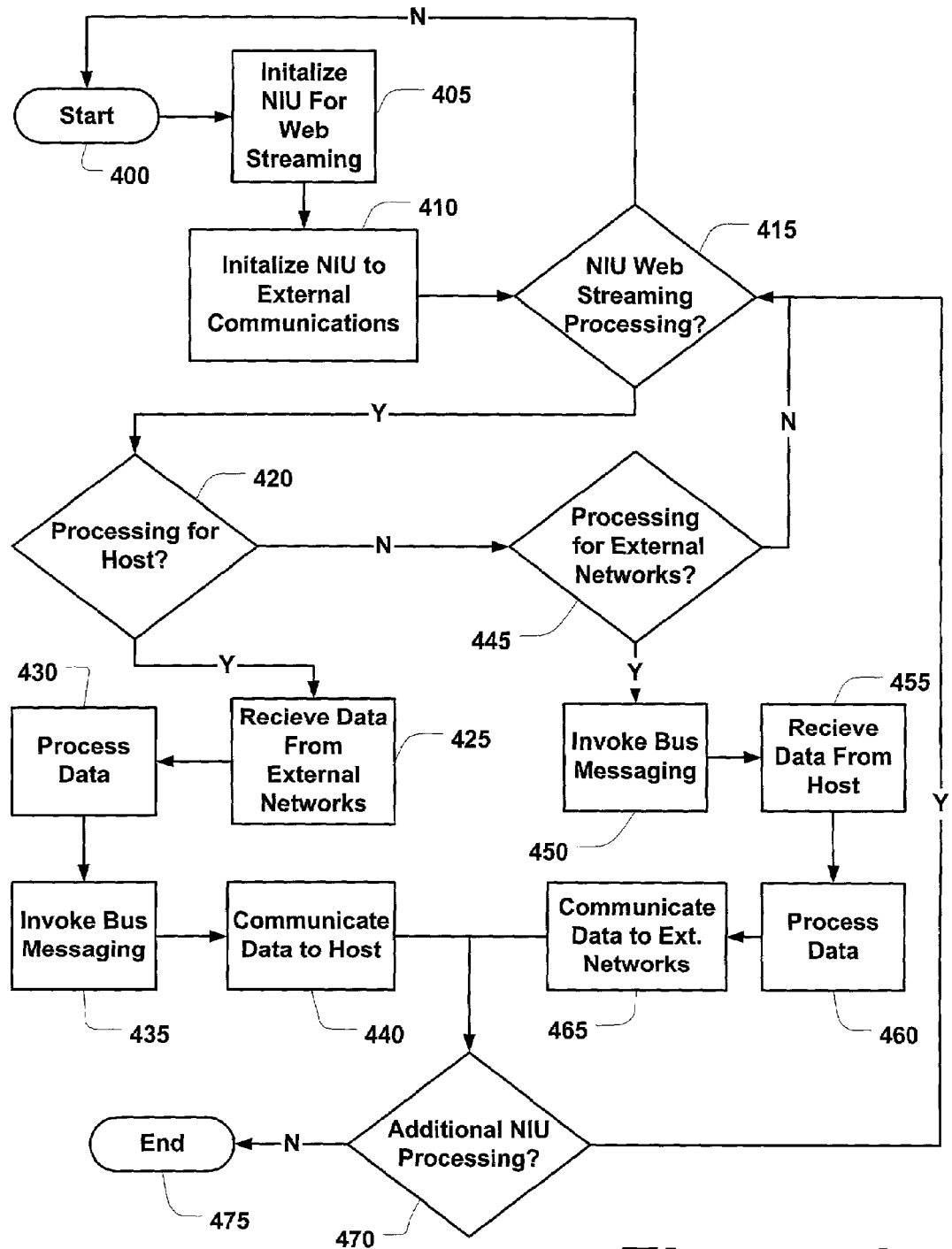
FIG. 4 is a flow diagram of the processing performed by the exemplary messaging platform to process data from external networks in accordance with the present invention.

FIG. 4 shows the processing performed by the messaging platform of the present invention to communicate data between the host computer and external computer networks. As shown, processing begins at block 400 and proceeds to block 405 where the NIU is initialized for Web streaming. The NIU is then initialized to cooperate with external networks at block 410. The NIU being initialized, a check is then performed at block 415 to determine if the NIU is to engage in Web streaming processing. If Web streaming is not to be performed, processing reverts to block 400 and proceeds therefrom. However, if the NIU is to engage in Web streaming, processing proceeds to block 420 where a subsequent check is performed to determine if the Web streaming processing is processing of data for the host computer. If the processing is directed for the host computer (e.g. initiated by the host computer to retrieve data from external networks), the data is received from external networks at block 425. Processing then proceeds to block 430 where the data is processed according to host computer syntax. Bus messaging (bus messaging allows components within the NIU to cooperate with each other to enable data communication and processing) is invoked at block 435 to prepare the data for communication to the host computer at block 440. From there, processing proceeds to block 470 where a check is performed to determine if there is additional processing required by the NIU. If there is required additional processing, processing reverts to block 415 and proceeds therefrom. However, if the alternative is true, processing terminates at block 475.

Alternatively, if at block 420 the determination proves that the processing performed by the NIU is not for the host computer but, rather is intended for external networks (e.g. place data from the host computer to external networks), processing proceeds to block 445. From there processing proceeds to block 450 where bus messaging is invoked for the NIU to receive data from the host computer at block 455 for processing at block 460. Having been processed, the data is communicated by the NIU to external networks at block 465. From there processing proceeds to block 470 and therefrom.

Figure 5:
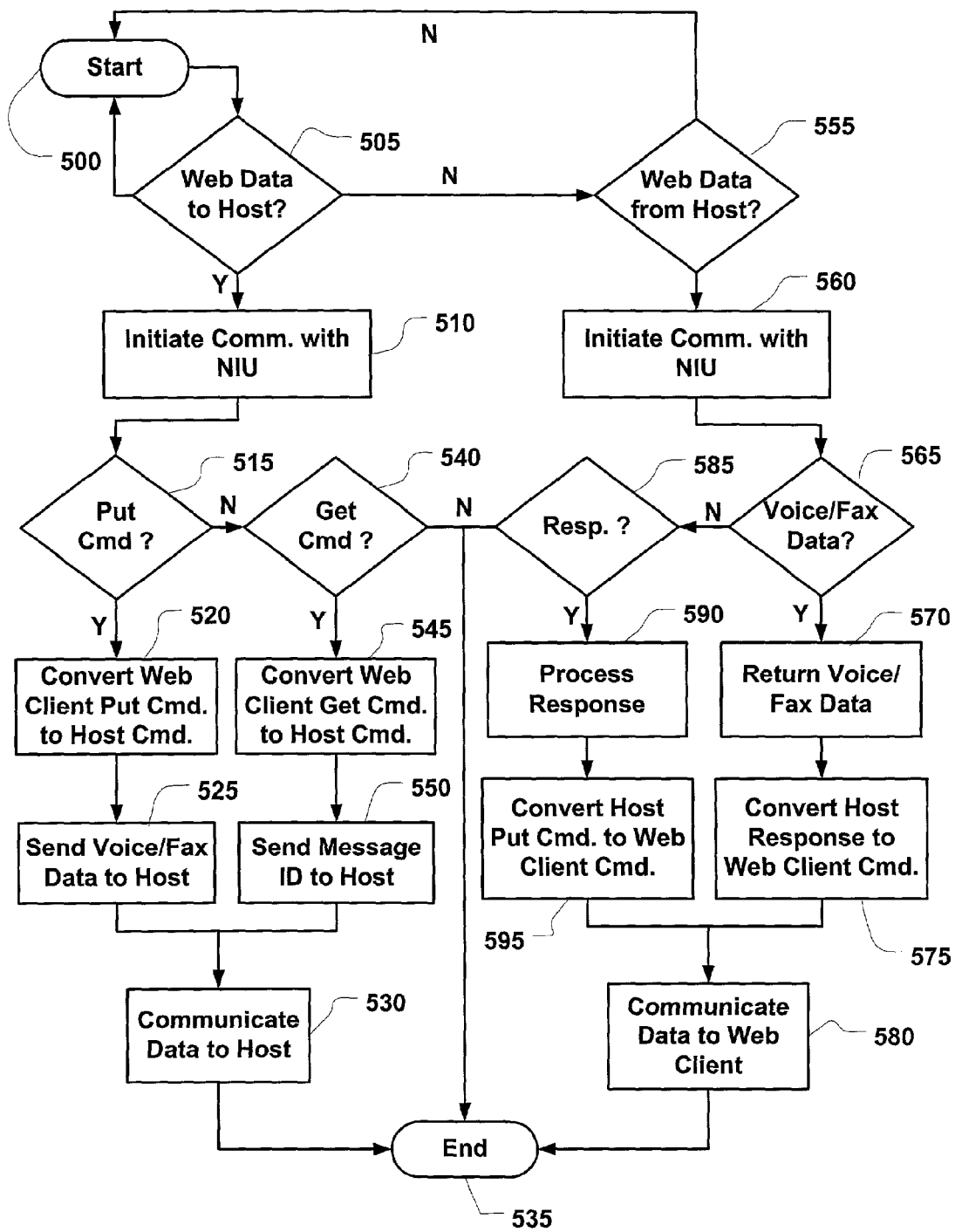
FIG. 5 is a flow diagram of the processing performed by the messaging system when executing messaging application web streaming functions in accordance with the present invention.

FIG. 5 shows the processing performed by a messaging platform to process Web-streaming of data. As shown, processing begins at block 500 and proceeds to block 505 where a check is performed to determine if a request for data is to be provided by an external computer network (e.g. from a Web client to the host computer to either retrieve or store voice/fax data). If the check renders that the data streaming processing to be performed is initiated by the external computer network, processing proceeds to block 510 where communication is initiated with the NIU of the messaging platform by external computer networks and by the host computer. From there, processing proceeds to block 515 where a check is performed to determine if data is to be placed on the host computer from external computer networks (e.g. if the Web client has offered a "PUT" command to place data on the host computer). If the check at block 515 is true, processing proceeds to block 520, where the command from external computer networks is converted to a command consistent with host computer syntax. In addition, data (e.g. voice/fax data) is attached with the command at block 525 for communication to the host computer at block 530. Once the data is communicated to the host computer, processing terminates at block 535. Alternatively, if the check at block 515 is false, processing proceeds to block 540 where a subsequent check is performed to determine if data is to be retrieved from the host computer to external networks (e.g. a "GET" command is offered by the Web client to retrieve stored data from the host computer). If the check at block 540 shows that data is not to be retrieved by external computer networks, processing proceeds to block 535 and terminates. However, if the alternative is true at block 540, processing proceeds to block 454 where the command to retrieve data is converted to a command consistent with host computer syntax. Within the command the message ID is included at block 550 for communication to the host computer at block 530. Once the ID is communicated processing terminates at block 535.

Alternatively, if at block 505 the check renders the process as not being initiated by external computer networks, processing proceeds to block 555 where a subsequent check is performed to determine if the data streaming processing has been initiated by the host computer of the messaging platform. If this check shows that the processing is not initiated by the host computer processing reverts to block 500 and proceeds therefrom. However, if the alternative is true, i.e. data streaming processing is initiated by the host computer, processing proceeds to block 560 where communication is initiated with the NIU by the host computer and by external computer networks. From there processing proceeds to block 565 where a check is performed to determine if the host computer is to provide data (e.g. voice/fax data) in response to a request for data from external computer networks. If the host is to provide data, processing proceeds to block 570 where the data is returned in response to the request from external computer networks. In addition, a command is provided with the returned data at block 575 to indicate to external computer networks that this data is in response to the initial request for data. The data and command are then communicated to external computer networks (e.g. Web client on the Internet) at block 580. Once communicated, processing terminates at block 535. Alternatively, if at block 565 the check proves that the host is not provide data in response to a request from external computer networks, processing proceeds to block 585 where a check is performed to determine if the host computer is to provide an indication in response to a request by external computer networks to store data on the host computer. If the host computer is not to provide such an indication, processing proceeds to block 535 and terminates. However, if the alternative is true, that is, the host computer is to provide an indication of data storage, processing proceeds to block 590 where the indication is processed and is converted at block 595 to a response consistent with external computer network syntax. The indication is then communicated to external computer networks at block 580. Once communicated, processing proceeds to block £and terminates.

Figure 3A:
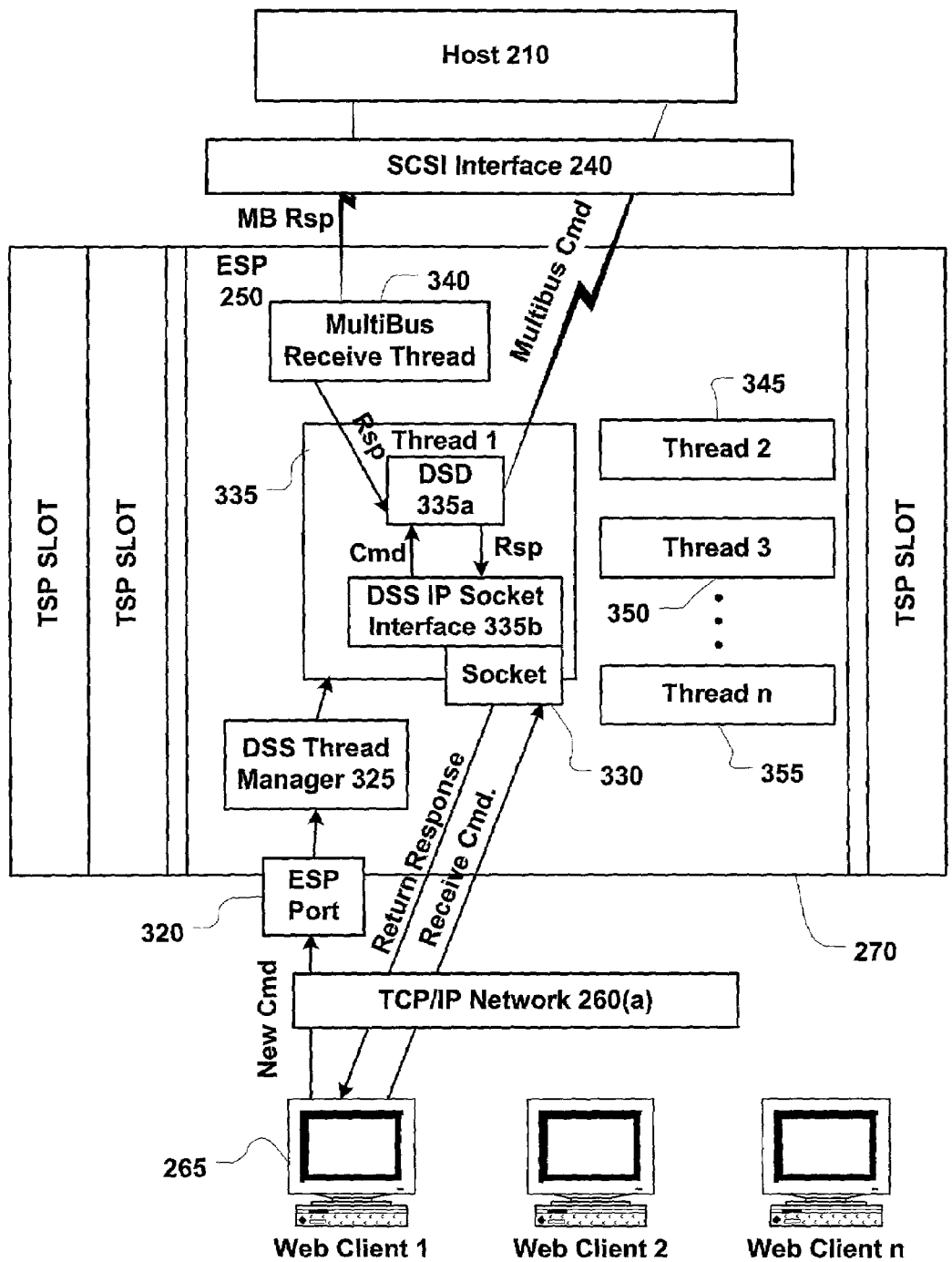
FIG. 3A is a block diagram of an alternative exemplary messaging system having components that allow for data streaming in accordance with the present invention.
Figure 6:
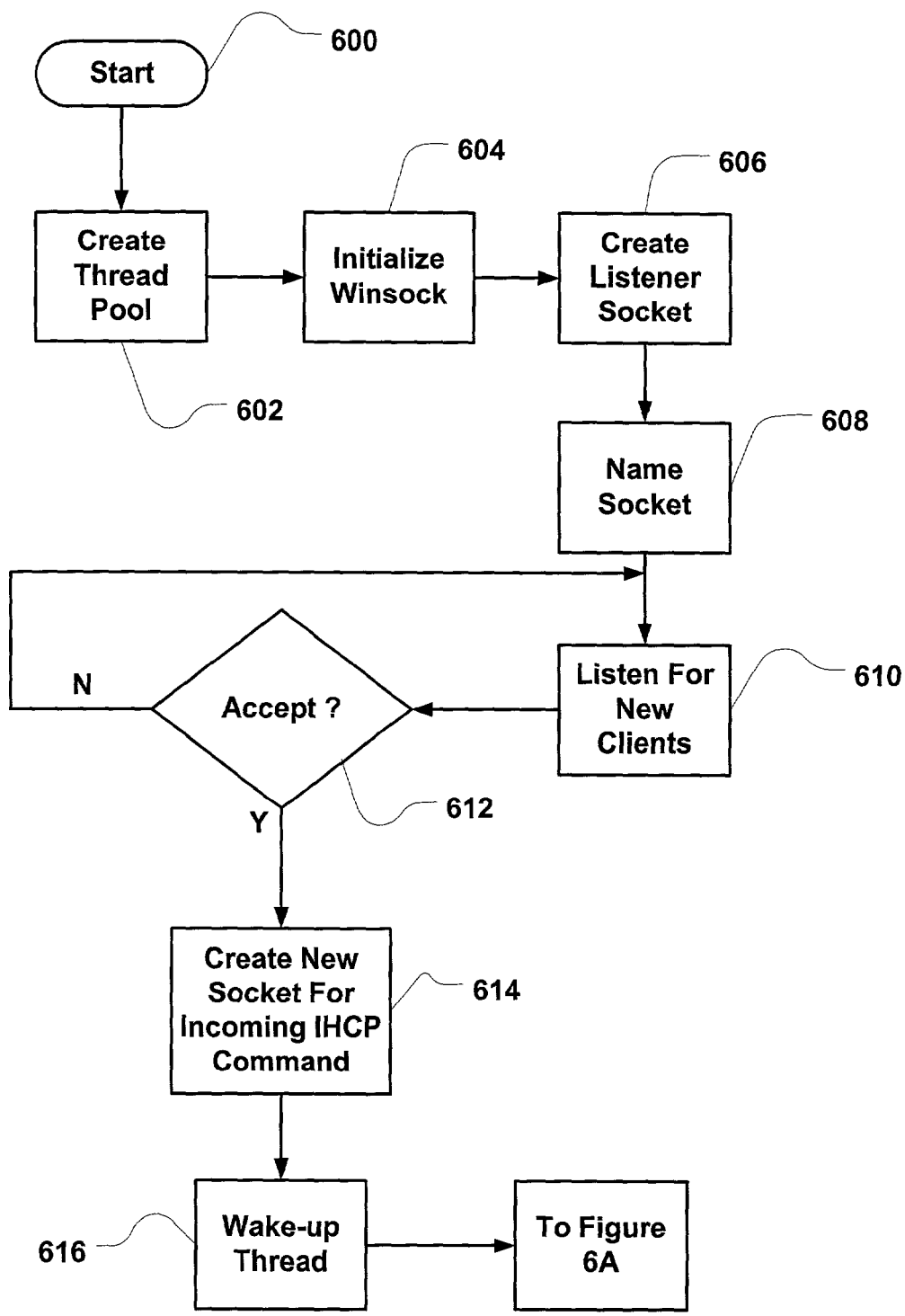
FIGS. 6–6B are flow diagrams of the processing performed by the alternative exemplary messaging platform in conjunction with external networks to process data streaming to and from external networks in accordance with the present invention.
Figure 6A:
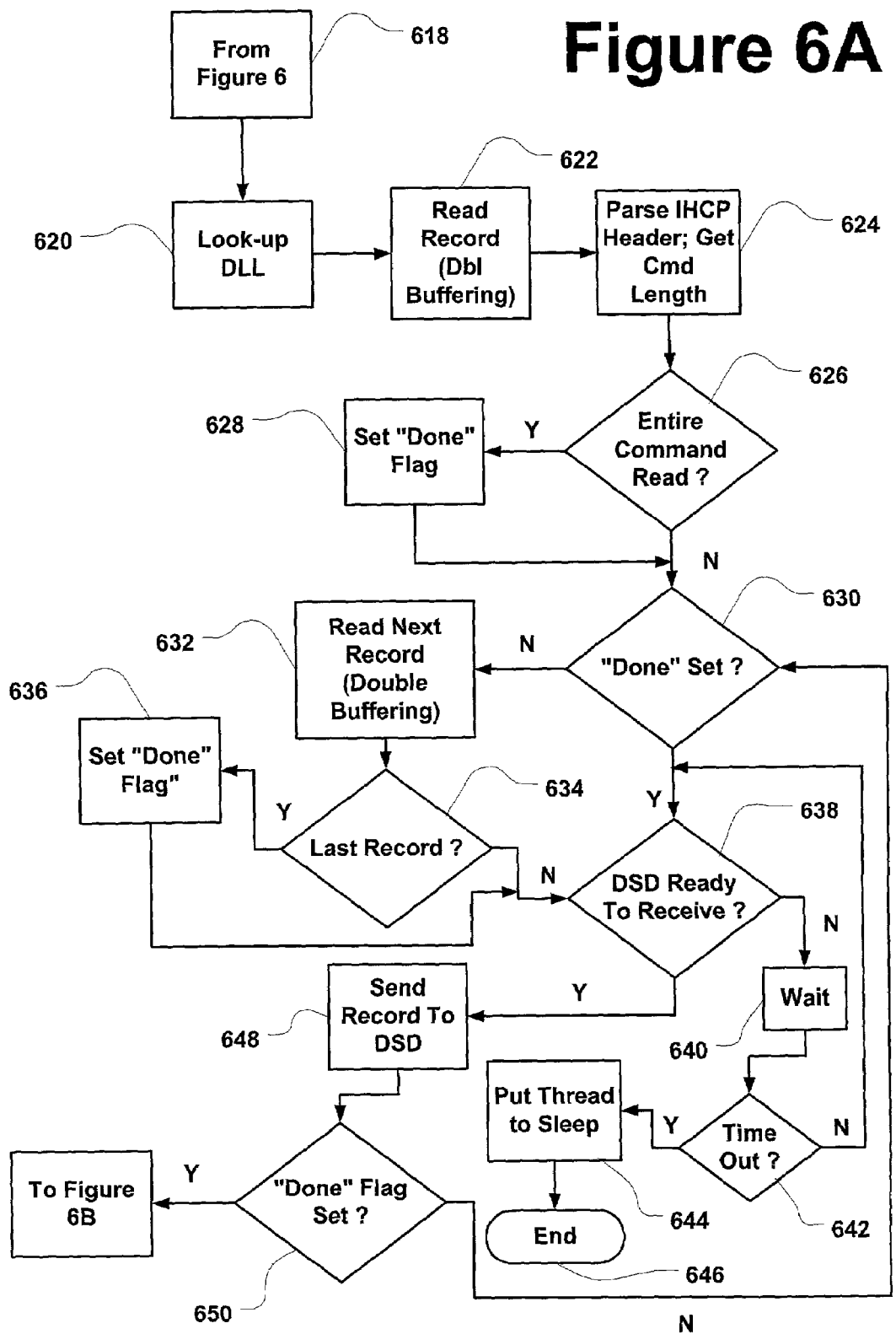
Figure 6B:
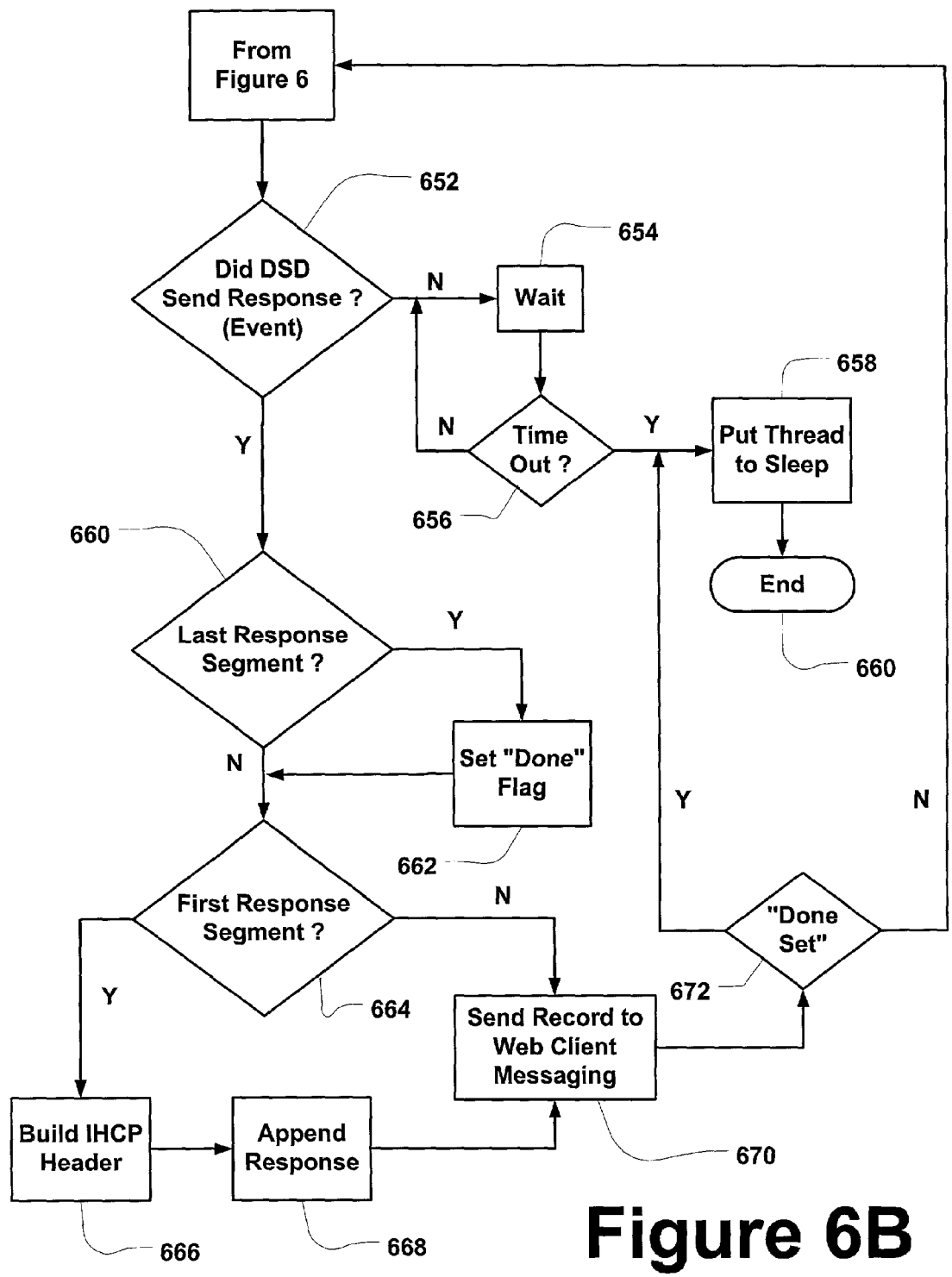

FIGS. 6–6B are flow diagrams of the processing performed by the preferred software architecture (as described in FIG. 3A) when streaming data. As shown in FIG. 6, processing begins at block 600 and proceeds to block 602 where a thread pool is created. From there the IP Socket communications interface is initialized at block 604. A listener socket is then created at block 606. A listener socket, as its name denotes, is a communications interface that monitors for the communication of commands from cooperating components. The socket is then named at block 608. Having been named, the listener socket then listens for commands from participating Web clients at block 610. A check is then performed at block 612 to determine if a new Web client has been accepted. If there no new accepted Web clients, processing reverts to block 610 and proceeds from there. However, if a new Web client has been accepted, processing proceeds to block 614 where a new communications socket is created for new incoming IHCP commands. From there, processing proceeds to block 616 where a thread is woken up.

As shown in FIG. 6A, once the thread has woken up at block 616, processing proceeds to block 620 where a DLL lookup is performed. The request is then read at block 622. From there processing proceeds to block 624 where the ICHP commands are parsed and the command length is determined. A check is then performed at block 626 to determine if the entire command has been read. If it has a "Done" flag is set at block 628 and processing proceeds to block 630. If the entire command has not been read, a check is then performed at block 630 where a "Done" flag set condition is tested. If the "one" flag has not been set at block 630, processing processed to block 632 where the next record (e.g. command record) is read. Alternatively, if the "Done" flag has been set at block 630, processing proceeds to block 638. From block 632, processing proceeds to block 634 where a check is performed to determine if it is the last record. If it is the last record the "Done" flag is set. However, if the check at block 634 indicates that it is not the last record, processing proceeds to block 638 where a check is performed to determine if the DSD is ready to receive the commands. If the DSD is not ready, processing proceeds to block 640 where a wait occurs. After a predetermined period of time a check is performed at block 642 to determine if the maximum time allotment has been exceeded. If the predetermined period has not been exceeded, processing reverts to block 638. However, if the predetermine period of time has been exceeded, processing proceeds to block 644 where the thread is put to sleep. Processing then terminates at block 646.

If, however, at block 638 the check proves that the DSD is ready to receive commands, processing proceeds to block 648 where the command record is sent to the DSD. A check is then performed to determine if the "Done" flag has been set. If the "Done" flag has not been set, processing reverts back to block 630. If, however, the check at block 650 shows that the "Done" flag has been set, processing proceeds to block 652 of FIG. 6B.

As shown in FIG. 6B, a check is performed at block 652 to determine if the DSD has send a response. If it has not, processing waits at block 654 for some predetermined time period. A check is then performed at block at block 656 to see if the wait time has exceeded a predetermined time limit. If it has processing proceeds to block 658 where the thread is put to sleep. From there, processing terminates at block 660. If, however, the check at block 652 indicates that the DSD has sent a response, processing proceeds to block 660 where a check is performed to determine if it is the last response segment. If it is not the last segment, processing proceeds to block 664. If, however, it is the last response segment, processing proceeds to block 662, where a second "Done" flag is set. From there processing proceeds to block 664 where a check is performed to determine if it is the first response segment. If it is the first response segment, an IHCP header is built at block 666, the response is appended at block 668 and sent to the Web client at block 670. If the check at block 664 indicates that it is not the first response segment, processing proceeds to block 670. From block 670, processing proceeds to block 672 where a check is performed to determine if the second "Done" flag is set. If has been set processing proceeds to block 658 and proceeds from there. However, if the check at block 672 indicates that the "Done" Flag has not been set, processing reverts back to block 652 and proceeds from there.

As the foregoing illustrates, the present invention is directed to a messaging system having a network interface unit (NIU) with an embedded services processor (ESP) that provides a general purpose computing capability within the NIU and that may also have the ability to connect to networks external to the messaging system via that general purpose computing capability to allow the streaming of data. It is understood that changes may be made to the embodiments described above without departing from the broad inventive concepts thereof. For example, the present invention is by no means limited to use in a messaging system that employs the Unisys Network Applications Platform, nor is the invention limited to use with the Unisys Telephony Services Processor (TSP). Rather, the present invention may be employed in connection with any suitable messaging platform and network interface unit architecture. Accordingly, the present invention is not limited to the particular embodiments disclosed, but is intended to cover all modifications that are within the spirit and scope of the invention as defined by the appended claims.

It should also be noted that the present invention may be implemented in a variety of computer systems. The various techniques described herein may be implemented in hardware or software, or a combination of both. Preferably, the techniques are implemented in computer programs executing on programmable computers that each include a processor, a storage medium readable by the processor (including volatile and non-volatile memory and/or storage elements), at least one input device, and at least one output device. Program code is applied to data entered using the input device to perform the functions described above and to generate output information. The output information is applied to one or more output devices. Each program is preferably implemented in a high level procedural or object oriented programming language to communicate with a computer system. However, the programs can be implemented in assembly or machine language, if desired. In any case, the language may be a compiled or interpreted language. Each such computer program is preferably stored on a storage medium or device (e.g., ROM or magnetic disk) that is readable by a general or special purpose programmable computer for configuring and operating the computer when the storage medium or device is read by the computer to perform the procedures described above. The system may also be considered to be implemented as a computer-readable storage medium, configured with a computer program, where the storage medium so configured causes a computer to operate in a specific and predefined manner.

What is claimed is:

1. A messaging system capable of streaming data comprising:
   at least one host computer, said host computer comprising a messaging platform upon which messaging applications are executed and a message store for storing messages received by said messaging platform;
   at least one network interface unit (NIU) having a first interface to the messaging platform on the host computer for communicating between said NIU and said messaging platform and a second interface to a telephone network for receiving calls from said telephone network; and
   at least one embedded services processor (ESP), located within said NIU, operatively coupled to said first and second interfaces of said NIU for communicating to external computer networks having at least one client computer, said ESP comprising a processor, a memory, and an operating system,
   wherein said ESP is operable to execute a data streaming software application, said data streaming software application operating on said ESP to execute one or more instructions that allow for the communication of data and operation of functions from said at least one client computer with said host computer and vice versa, wherein said data streaming software application comprises:
   a command conversion module, said command conversion module translating commands from said at least one client computer to a command syntax for said host computer and vice versa; and
   a data streaming service (DSS) manager, said DSS manager assigning a single thread for each received command to stream data between said at least one client computer and said host computer, wherein the messaging system processes multiple concurrent commands to stream data.

2. The messaging system as recited in claim 1, wherein said ESP further comprises a network interface that supports an IP protocol for communicating between said ESP and said external computer networks.

3. The messaging system as recited in claim 2, wherein said network interface comprises an Internet Protocol (IP) Socket Proxy.

4. The messaging system as recited in claim 3, wherein said Internet Protocol (IP) Socket Proxy comprises a Winsock Proxy.

5. The system recited in claim 1, wherein said operating system of said ESP comprises the Microsoft Windows NT operating system.

6. The system as recited in claim 1, wherein said data streaming software application
   comprises:
      a communication interface module, said communication interface facilitating the communication of data between said messaging platform and said external computer networks.

7. The system as recited in claim 6, wherein said communication interface module
   comprises a socket manager controlling data communication sockets used for the communication of data from external computer networks to said messaging platform and vice versa.

8. The system as recited in claim 7, wherein said communication interface module is coupled to said external computer networks via a communications network, said communications network comprising any of a fixed-wire LAN, a wireless LAN, a fixed wire WAN, a wireless WAN, an fixed wire intranet, a wireless intranet, a fixed wire extranet, a wireless extranet, the Internet, and the wireless Internet.

9. The system as recited in claim 8, wherein said command conversion module cooperates with said communication interface module to communicate data to and from said messaging platform from and to said external computer networks.

10. The system as recited in claim 6, wherein said command conversion module further comprises a messaging platform-external computer network command conversion module and an external computer network-messaging platform command conversion module, said messaging-platform-external computer network command conversion module converting commands from said messaging platform to commands consistent with said external computer networks, and said external computer network-messaging platform command conversion module converting commands from said external computer networks to commands consistent with said messaging platform.

11. The system as recited in claim 10, wherein said commands comprise commands indicative of data streaming.

12. The system as recited in claim 11, wherein said data streaming comprises Web-data streaming.

13. The system as recited in claim 12, wherein said external computer networks comprise Web clients capable of providing commands to said NIU and displaying communicated from said NIU.

14. In a messaging system having a host computer coupled to a network interface unit (NIU), a method to provide data streaming of data comprising the steps of:
   providing a data streaming software application for execution on said NIU;
   providing an Embedded Services Processor (ESP) in said NIU such that said ESP is operatively coupled to said NIU to allow communication of data from said ESP to said host computer and back, wherein said ESP executes said data streaming software application;

connecting said NIU to at least one external computer network such that data communication is realized between said NIU and said at least one external computer network, said at least one external computer network having at least one client computer operating various computing applications; and communicating data by said at east one client computer to said host computer of said messaging system through said NIU, and vice versa, to execute instructions in accordance with said computing applications operating on said computers of said external computer networks and said host computer, wherein said ESP converts a command syntax of said at least one client computer to a command syntax of said host computer and vice versa, and wherein said ESP contains a data streaming service (DSS) manager, said DSS manager assigning a single thread for each received command to stream data between said at least one client computer and said host computer wherein the messaging system processes multiple concurrent commands to stream data.

15. The method recited in claim 14, wherein said providing step further comprises initializing said ESP to cooperate with components of said messaging system and to communicate with other computing devices.

16. The method recited in claim 14, wherein said communicating step comprises using IP
communication protocols and standards realized by an ESP socket manager residing on said data streaming software applications to transfer data between said ESP and said external computer networks.

17. The method recited in claim 14, wherein said connecting step comprises providing computers having Web client computing applications capable of providing requests for data streaming and presenting streamed data.

18. A computer readable medium comprising computer-executable instructions for instructing a computer to perform the method recited in claim 14.

19. In a messaging system having a host computer operatively coupled to a network interface unit (NIU) having an embedded services processor (ESP) capable of executing software and communicating data in a variety of communication protocols and standards, a method to stream data to and from external communication networks coupled to external computer networks comprising the steps:

receiving requests indicative of data streaming functions by said external computers, the requests received in an external computer command form;

converting the external computer command syntax to host computer command syntax;

assigning a single thread for each received request to stream data; responding to said requests by streaming data between said external computers and said host computer, wherein multiple concurrent requests to stream data between said external computers and said host computer are accommodated using multiple concurrent threads.

20. The method as recited in claim 17, wherein said providing step comprises the step of:

providing a "GET" command in said request, said "GET" command indicative of instructions to stream data stored on said host computer of said messaging platform to said external computer networks.

21. The method as recited in claim 19, wherein said providing step comprise the steps of:

providing a "PUT" command in said request, said "PUT" command having attached thereto data for streaming, said "PUT" command indicative of instructions to stream data from said external computer networks to said host computer of said messaging platform for storage.

22. The method as recited in claim 19, wherein said responding step comprises the steps of:

receiving said request provided by said external computer networks by said NIU of said messaging platform, said NIU being coupled to said external computer networks through a communications interface.

23. The method as recited in claim 22, further comprising the steps of processing said converted commands to store data for requests from said external computer networks requesting the storage of data;

providing a response indicator to said external computer networks to indicate that the request to store data has been completed, said response indicator being converted to a command syntax consistent with said external computer networks for processing by said external computer networks.

24. The method as recited in claim 22, further comprising the step of:

processing said converted commands to provide desired data to respond to requests requesting desired data,
wherein said desired data is demarcated by a unique ID, said converted commands having therein said unique ID for processing by said host computer, and retrieving said desired data by said host computer of said messaging platform for communication to said external computer networks,
wherein said retrieved desired data having therein a command consistent with the command syntax of said external computer networks for processing by said external computer networks.

25. A messaging system capable of streaming data comprising:

at least one host computer, said host computer comprising a messaging platform upon which messaging applications are executed and a message store for storing data received by said messaging platform;

at least one network interface unit (NIU) having a first interface to the messaging platform on the host computer for communicating data between said NIU and said messaging platform and a second interface to external computer networks having at least one client computer for communicating data between said NIU and said external computer networks; and at least one embedded services processor (ESP), located in said NIU, operatively coupled to said first and second interfaces of said NIU, said ESP comprising a processor, a memory, and an operating system, wherein said ESP is operable to execute a data streaming software application, said data streaming software application operating on said ESP to execute one ore more instructions that allow for the communication of data and operation of functions from said computer networks with said host computer and vice versa, wherein said ESP is operable to execute a data streaming software application, said data streaming software application operating on said ESP to execute one or more instructions that allow for the communication of data and operation of functions from said at least one client computer with said host computer and vice versa, wherein said data streaming software application comprises:
a command conversion module, said command conversion module translating commands from said at least one client computer to a command syntax for said host computer and vice versa, and
a data streaming service (DSS) manager, said DSS manager assigning a single thread for each received request to stream data between said at least one client computer and said host computer, wherein the messaging platform concurrently processes multiple requests to stream data.

26. The system as recited in claim 25, wherein said data streaming software application comprises:
a data streaming service (DSS), said data streaming service manager processing and responding to commands communicated from cooperating Web clients of said external computer networks; and
a data streaming DLL (DSD), said DSD cooperating with said DSS to process said Web client commands.

27. The system as recited in claim 26, wherein said DSD converts commands originating from said Web clients of said external computer networks into a command type capable of being processed by said host computer.

28. The system as recited in claim 26, wherein said DSD communicates commands originating from said Web clients of said external networks and converted commands to said host computer and vice versa through a MultiBus.

29. The system as recited in claim 26, further comprising at least one thread, said one thread executing said DSS and said DLL.

30. The system as recited in claim 29, further comprising a DSS thread manager, said DSS thread manager cooperating with said at least one threads to route any of data, commands, and operations for processing by said thread to realize data streaming services.

31. The system as recited in claim 25, wherein said NIU communicates to said external computer networks through at least one TCP/IP network operating the TCP/IP communications protocol.

* * * * *

UNITED STATES PATENT AND TRADEMARK OFFICE
CERTIFICATE OF CORRECTION

| | | |
|---|---|---|
| PATENT NO. | : 7,165,114 B1 | Page 1 of 1 |
| APPLICATION NO. | : 10/038962 | |
| DATED | : January 16, 2007 | |
| INVENTOR(S) | : Gary Russel et al. | |

It is certified that error appears in the above-identified patent and that said Letters Patent is hereby corrected as shown below:

Column 17, Line 10 delete "east" and insert -- least -- after the word "at";

Column 17, Line 31 delete "ESP" and insert --IP-- after the word "an"

Signed and Sealed this

Third Day of July, 2007

JON W. DUDAS
*Director of the United States Patent and Trademark Office*